United States Patent
Frigge et al.

(10) Patent No.: US 11,198,804 B2
(45) Date of Patent: Dec. 14, 2021

(54) TRANSPARENT SEALANT AND ITS PRODUCTION AND USE

(71) Applicant: Coroplast Fritz Müller GmbH & Co. KG, Wuppertal (DE)

(72) Inventors: Christoph Frigge, Sprockhövel (DE); Nina Putsch, Wuppertal (DE); Torsten Fieselmann, Hilden (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 0 days.

(21) Appl. No.: 15/404,791

(22) Filed: Jan. 12, 2017

(65) Prior Publication Data

US 2017/0218240 A1     Aug. 3, 2017

(30) Foreign Application Priority Data

Feb. 2, 2016 (DE) ..................... 10 2016 101 806.6

(51) Int. Cl.
     *C09K 3/10*      (2006.01)
     *C08F 220/18*      (2006.01)
     *C08F 220/14*      (2006.01)

(52) U.S. Cl.
     CPC .......... *C09K 3/1006* (2013.01); *C08F 220/14* (2013.01); *C08F 220/18* (2013.01); *C09K 2003/1093* (2013.01)

(58) Field of Classification Search
     CPC .......... C09K 3/1006; C09K 2003/1093; C08F 220/18; C08F 220/14
     See application file for complete search history.

(56) References Cited

U.S. PATENT DOCUMENTS 5,180,756 A * 1/1993 Rehmer ..................... C09J 4/06
     522/12
5,385,772 A * 1/1995 Slovinsky .............. C09J 133/06
     428/220
2010/0101723 A1 * 4/2010 Okamoto ............... C09J 133/08
     156/306.6
2011/0030756 A1 * 2/2011 Honda .................. H01L 31/048
     136/244
2014/0124235 A1    5/2014 Blakemore
2016/0002378 A1 * 1/2016 Shimizu ............... C09D 153/00
     525/330.3
2017/0121597 A1 * 5/2017 Kataoka ................. C09K 11/06

FOREIGN PATENT DOCUMENTS

| AT | 318043 B | 9/1974 | |
|---|---|---|---|
| DE | 1831658 U | 5/1961 | |
| DE | 102013111876 A1 | 5/2014 | |
| DE | 202015106261 U1 | 12/2015 | |
| EP | 2868722 A1 | 5/2015 | |
| WO | 2014028203 A1 | 2/2014 | |
| WO | WO-2015194595 | * 12/2015 | ............. C09K 11/06 |

OTHER PUBLICATIONS

Stevens (Polymer Chemistry: An introduction, 3rd ed., Oxford, p. 172) (Year: 1999).*
Seitz et al., "An examination of UV radiation tolerance and photoenzymatic repair capabilities across temperature in the freshwater cladocerans *Scapholeberis mucronata, Diaphanosoma birgei*, and *Moina* spp", J. of Freshwater Ecology; vol. 32; p. 643-652 (Year: 2017).*

* cited by examiner

*Primary Examiner* — Jessica M Roswell
(74) *Attorney, Agent, or Firm* — Dickinson Wright PLLC

(57) ABSTRACT

A transparent sealing compound, in particular for use in a wall penetration of lines or in a splice site of a cable set. In order to have greater flexibility the sealing compound consists of a radiation crosslinked, in particular UV-crosslinked, poly (alkyl acrylate). The sealing compound is crosslinked such that its elongation amounts to more than 1000% for a material thickness of 1.5 mm according to ISO 527-2/1BA/300 and its shear strength is less than 1000 min according to DIN EN 1943 (tested per method A, 625 mm$^2$ contact surface area).

17 Claims, No Drawings

TRANSPARENT SEALANT AND ITS PRODUCTION AND USE

CROSS REFERENCE TO RELATED APPLICATION

This application claims priority to DE 10 2016 101 806.6 filed Feb. 2, 2016, the entire contents of which are incorporated herein by reference.

FIELD

The present invention relates to a transparent sealing compound, in particular for use in a wall penetration of lines or in a splice site of a cable set. Furthermore, the invention relates to a use of this kind of sealing compound for sealing a spliced cable set and a wall penetration for lines.

BACKGROUND

The statements in this section merely provide background information related to the present invention and may not constitute prior art.

Elongated materials, such as lines or hoses, often must be sealed in wall penetrations against liquids or gases moving along the material. In the case of single lines, flexible sleeves are sufficient, which have a somewhat smaller diameter than the material, and which can additionally be glued if necessary. However, if several bundled lines have to be sealed, a sealing compound is additionally used which fills and seals the spherical interstices between the preferentially round lines.

Several wall penetrations of lines on a flame sensor apparatus are described in DE 10 2013 111 876 A1. The subject matter of the application relates to a cable arrangement featuring a housing. The housing defines an interior volume and the housing has a first cable end part and a second cable end part. The cable arrangement also has at least two cable fittings, wherein the first cable end part and the second cable end part are joined to a cable fitting by a first gasket. Each of the cable fittings defines a cable fitting opening. Furthermore, the cable arrangement has an electric cable. The electric cable is passed through the cable fitting opening in each cable fitting and through the interior volume of the housing. Furthermore, the cable arrangement has a second gasket which is located in the annular space between the electric cable and the cable fitting opening of the first cable end part. The second gasket is designed such that moisture and contamination are prevented from penetrating through the cable fitting opening. Furthermore, the cable arrangement has a third gasket and at least one deformable gasket component which are located at the second cable end part. The third gasket and the at least one deformable gasket component are likewise designed such that moisture and contamination are prevented from passing through the cable fitting opening. In order to achieve this, the second gasket and/or the third gasket of the cable arrangement can have an epoxy material which can in particular be a high-temperature epoxy for use at temperatures up to 250° C. or more.

A sealing problem similar to that described above, is encountered when electric cables are to be spliced and the splice sites are to be sealed against moisture or aggressive gases. In the case of single wires, frequently heat-shrink tubing is used; however, an additional sealing compound is required for splice sites from where more than two wires exit.

For example, in the German Utility Model 1 831 658 a known gasket for connections of cable sleeves and housings of end seals, or housings of connecting sleeves is described, in which via a connecting site created by welding, soldering, gluing, or other methods in order to secure against mechanical stresses and also against any leaks, an element made of an unspecified cast resin sealing compound is arranged. This element is intended to prevent the connecting sites from leaking due to mechanical stresses, such as for example, pressure, tensile or shock effects which can occur after laying of a cable.

Said epoxy cast resins are transparent, which indicates that transparent casting materials of the kind stated above, which are formed from casting resins on the basis of polyesters or epoxy resins, represent the known prior art with regard to the inventive sealing compound. The disadvantages of such reactive materials—usually consisting of several components, like those described in DE 10 2013 111 876 A1—are their complicated processing, a long hardening time and also a deficient flexibility of the hardened materials. However, the advantage of such slow hardening materials is their easy to use transparency, and that the resulting seal is usually highly pressure-tight and resistant to mechanical stresses.

If the lines are flexible, a flexible sealing compound is preferentially used as well, since the sealing compound otherwise can break in case of movements and the sealing effect can be reduced. Both for the longitudinal sealing of cable bundles and also for splice sealing, sealing compound which consist of butyl rubber, polyisobutylene and carbon black have long been used as such flexible sealing compound for the flexible sealing compound, which can also flow between the lines. Such sealing compound are described, for example, in AT 318 043 B. A disadvantage of these butyl rubber materials is that they already have a high creep tendency at room temperature, and especially they can even flow out from the sealant site again when heated, as a result of which the sealing effect is reduced. Furthermore, it can be a disadvantage that the sealing compound is black and thus not transparent, which prevents a verification of a proper positioning over a splice site upon assembly. In addition, sealing compound containing carbon black also have an, albeit low, conductivity, which in particular can be a disadvantage when sealing exposed, live contacts.

SUMMARY

The underlying object of the present disclosure is to create an easy to assemble, transparent sealing compound with a high sealing effect, in particular for use in a wall penetration of lines or in a splice site of a cable set, in a cable set sealed with this kind of sealing compound and also to a wall penetration for lines with this kind of sealing compound, wherein the advantages of the transparency and the provision of a seal which is pressure-tight and resistant to mechanical stresses, and of a higher flexibility are ensured.

The problem underlying the invention is solved in that the sealing compound consists of a radiation crosslinked poly (alkyl acrylate), which is crosslinked such that its elongation amounts to more than 1000%, preferably more than 1500%, for a material thickness of 1.5 mm according to ISO 527-2/1BA/300 (issue June 2012) and its shear strength is less than 1000 min, preferably less than 700 min, according to DIN EN 1943 (issue January 2003, tested per method A, 625 $mm^2$ contact surface area). A lower limit of shear strength can be 100 min, and an upper limit of elongation 5000%. However, the latter, in particular, does not represent a critical value with respect to the invention. Unless otherwise indicated, when the aforementioned or other standards are referred to hereinafter, the issues valid at the date of the application are always meant.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is in no way intended to limit the present invention or its application or uses. It should be understood that throughout the description and drawings, corresponding reference numerals indicate like or corresponding parts and features.

The use of different kinds of radiation, in particular, UV-polymerized and/or crosslinked acrylate materials is a known prior art for the production of adhesive materials. The use of such standard adhesive materials as sealing compound is, however, not possible, since due to their high cohesion they cannot sufficiently flow around and seal the lines.

Within the scope of the invention, UV-light is used, in particular, for the polymerization and radiation crosslinking.

According to DIN 5031, part 7 (January 1984) the spectrum in the ultraviolet (UV) comprises the wavelengths from 100 nm to 380 nm, wherein the upper value represents the limit of visible light. The frequency of the radiation, thus, extends from 789 THz (380 nm) to 3 PHz (100 nm). This range is divided into the lower ranges of UV-A, UV-B and UV-C. The wavelength range of UV-C radiation extends from 100 nm to 280 nm, and the photon energy is in the range of 4.43 eV to 12.4 eV.

The preferred crosslinking within the scope of the present disclosure is one in which the UV-A radiation, also called "near UV" or "black light", is used. In this case, the wavelength range extends from 315 nm to 380 nm, and the photon energy is in the range from 3.26 eV to 3.94 eV. A sufficient crosslinking is obtained with a preferred radiation dose which is in the range from 400 mJ/cm$^2$ to 600 mJ/cm$^2$.

In contrast to crosslinking techniques which are used in the production of acrylate adhesives and aimed at achieving high adhesiveness and high adhesive cohesion, according to the invention the degree of crosslinking of the polyacrylates is kept smaller, so that they already perform their sealing function after applying a small manual pressure. However, to prevent a spontaneous flowing of the inventive sealing compound under the operating conditions and thus to limit the flow behavior of the inventive sealing compound, it is important to add small quantities of multifunctional acrylate monomers in a preferred embodiment of the inventive production method of the sealing compound; the term "multifunctional" is understood to mean that the monomer alkyl acrylate contains more than one acryl group (CH$_2$=CH—COR).

As a result of this, for the respective formation of the polymer in the molecules, a number of free valences are provided which allow polymerization under simultaneous crosslinking. In this way, not only are polymer chains formed, but also a three-dimensional network which is characterized by the advantage of the availability of rubber elasticity.

For example, the poly(alkyl acrylate) can contain 89.0 wt. % to 99.9 wt. %, alternatively 98.0 wt. % to 99.9 wt. % of one or several alkyl acrylate monomers with 4 to 20 carbon atoms in the alkyl chain, and 0 wt. % to 10.0 wt. %, alternatively 0 wt. % to 1.9 wt. % of acrylic acid and/or methacrylic acid, and also 0.1 wt. % to 1.0 wt. % of one or several photo-initiators which absorb UV light in the range of 200 nm to 400 nm, alternatively in the range of 315 nm to 380 nm. In this regard, the UV-A radiation in the preferred wavelength range is used for crosslinking. For the poly(alkyl acrylate), it can, in particular, be provided that it contains 0.01 wt. % to 1.0 wt. % of an alkyl diol diacrylate monomer or of an alkyl triol triacrylate with 4 to 20 carbon atoms in the alkyl chain.

The sealing compound according to the invention combine a high transparency of the seal with a long-term, highly effective sealing effect, wherein the advantages of high flexibility with good resistance to mechanical stresses, such as pressure, stress and shocks, are attained.

Due to the elongation of more than 1000% (according to ISO 527-2/1BA/300 [June 2012]), which is extremely high compared to known acrylate materials, with a material thickness of 1.5 mm and a shear strength according to DIN EN 1943 (issue January 2003, tested per method A, 625 mm$^2$ contact surface area) of less than 1000 min obtained by means of UV-crosslinking in the inventive sealing compound, a balanced relationship between adhesion and cohesion are attained in the crosslinked poly(alkyl acrylate) with respect to the intended use of the sealing compound according to the invention.

In this context, the sealing compound according to the present disclosure has a high elasticity, especially in comparison to conventional butyl-based sealing compound. The filling of interstices to be sealed is attained hereby a low deformation energy, which is less than 0.1 N/mm$^2$ to achieve a 200% elongation.

In comparison to the known butyl rubber materials, the viscous portion of the inventive sealing compound responsible for the creeping is reduced significantly, so that it does not tend to spontaneously flow in a significant manner, either at room temperature or at higher temperatures.

However, the sealing compound is flowable under minor, in particular, manual pressure, so that—in contrast to the known acrylate adhesives—, it can fill the interstices between the lines of a line bundle during a standard application.

This favorable range of properties is also reflected, in particular, in the parameters of adhesive power on steel (adhesion) and shear strength (cohesion), measured at a room temperature of 23° C. and at an increased temperature of 70° C.

While the sealing compound according to the present disclosure is located between the elongated material and a wall of the penetrated element in case of penetration, and thus is not accessible from the outside, unless additional measures were taken, it would be exposed in case of splice connections. Since exposed, adhesive spots at assembly sites are generally not acceptable and in addition can withstand less mechanical load, they are thus additionally encased. This can be done, for example, with an adhesive tape or with heat-shrink tubing.

A heat-shrink tube is a plastic hose which strongly contracts under the effect of heat—usually by the applying hot air thereto. With this method, the product introduced into the tube before the heating is electrically insulated against the environment and protected against mechanical damage.

A sealing effect attained by a sealing compound and an encasing element at a splice site can be checked in in a standardized manner in that a splice site having at least six cable leads on each side is surrounded with the sealing compound, encasing this splice site with a heat-shrink tube and measuring the resistance in between the wire and the water basin in a 5% NaCl solution at 100 V direct voltage. According to industry standards, the result must indicate resistance values greater than $2 \times 10^8$ Ohms so that the requirements placed on the sealing compound are met.

In addition, the tightness can be tested by means of a compressed air test in which an internal pressure is generated by means of a thin tube introduced into the splice site. The splice must withstand an internal pressure of 0.5 bar without developing air bubbles.

These requirements are met by the sealing compound according to the present disclosure. Other favorable embodiments of the present disclosure are included in the dependent claims and in the following, specific description.

According to one embodiment of the present disclosure, the sealing compound according to the present disclosure is used such that a splice site is surrounded on all sides with the sealing compound, and the splice is then encased in a heat-shrink tube or with an adhesive tape. The heat-shrink tube and/or adhesive tape should preferentially be transparent so that the splice site is visible.

In this case, the sealing compound can be applied in a tabular form, and it should preferably have a thickness in the range of 1.0 mm to 5.0 mm. The length and width of the table can be freely selected and should, in particular, be easy to assemble. For example, a sealing compound table can be configured in an A5 or A4 format or as a 5 cm×10 cm strip.

In another embodiment, the sealing compound according to the present disclosure is applied to a carrier foil. Thus, an additional expense resulting from wrapping a sticky sealing compound site with an adhesive tape or also from pushing a heat-shrink tube over such site can be reduced. The carrier foil can, in particular, be made of a polymer, preferentially of polyethylene, polypropylene, polyester, polyamide, or polyurethane, or of copolymerizates or coextrudates of these plastics. The carrier foil should preferentially be transparent, puncture-resistant and/or flexible. On the one hand, it can be used to facilitate the sliding of a heat-shrink tube over the splice site which is no longer sticky due to the presence of the foil, or it can also be used to provide external protection to the sealing compound. Under certain circumstances, an additional heat-shrink tube or an adhesive tape for wrapping can even be eliminated entirely. According to the application, the assembly consisting of the inventive sealing compound and the carrier foil is designated as a sealing tape according to the present disclosure.

Preferentially, the sealing compound is applied to the carrier foil such that the carrier foil has an uncoated edge on at least one side. Thus, the sealing compound, if applied under manual pressure for encasing of the sealing point, can flow into the space between the uncoated edge and the elongated material without escaping from the uncased region of the sealing point. The width of the uncoated edge of the foil should be selected as a function of the size of the material to be sealed, the thickness of the sealing compound on the foil, and by the pressure to be applied for the application. In the case of manually processed split end points having a size of about 3.0 cm and a sealing compound of 1.5 mm thickness, the width is in the range of 0.5 cm to 2.0 cm. As regards the carrier material, it can have a thickness in the range of 20 μm to 500 μm, alternatively in the range of 50 μm to 200 μm.

Example

A mixture of 98.98 wt % of 2-ethylhexyl acrylate, 1.00 wt % of acrylic acid and 0.02% Ciba® Irgacure® 184 is pre-polymerized and agitated under a nitrogen flushing (300 RPM with a propeller agitator) with LED-light at a wavelength of 365 nm, until a viscosity of 2.3 Pas (measured at 23° C. with a commercial Brookfield viscometer, model RV DV-III U EZ, spindle 3) is obtained. The radiation of two Höhle "LED Spot 100" lamps with a power output of 800 mW/cm² was used for a 200-kg mixture.

Ciba® Irgacure® 184 is a photo-initiator which is used to start the polymerization and/or crosslinking of chemically unsaturated pre-polymers, for example, of acrylates. Specifically, it is 1-hydroxy-cyclohexyl-phenyl-ketone having a molecular weight of 204.3. After absorption of UV light, the molecules of this substance decay and due to the photolysis reaction form a reactive species which starts the chain.

The viscosity of a material that has been pre-polymerized in such a way in the first process step can fluctuate around ±30 percent.

The pre-polymerizate is then mixed with another 0.20 wt % of Ciba® Irgacure® 184, 0.10 wt. % of Ciba® Irgacure® 651 and 0.05 wt. % of Laromer® HDDA—relative to 100 wt % of pre-polymerizate—, applied to a siliconized paper liner at a film thickness of 1.5 mm, and then in turn polymerized and crosslinked with UV-A light under exclusion of oxygen. The exclusion of oxygen is attained by means of a nitrogen atmosphere.

Alternatively, the material can also be covered with a transparent, siliconized polyester foil liner to exclude oxygen. The siliconized liners will be removed before applying the material.

For crosslinking, the coated material was passed at a speed of 1 m/min through a 4 m-long radiation unit in which 40 UV-A lamps of the "Narva LT-T8 30 W 009 UV" type were installed. Thus, a UV radiation dose of 450 mJ/cm² is attained (measured with a Uvioure Plus II Radiometer from Dymax Co.).

Ciba® Irgacure® 651 is a photo-initiator which is likewise used to start the polymerization and/or crosslinking of chemically unsaturated pre-polymers, for example, acrylates. Specifically this compound is 2,2-dimethoxy-1,2-diphenyl ethane-1-one.

Laromer® HDDA is the name of an acrylic acid ester from BASF which can be used as a reactant in the production of polymers. The ester has two reactive acrylate groups per molecule which enables it—like other compounds of this class—to participate in co-polymerization and/or crosslinking reactions. In particular, it is hexane-1,6-diol diacrylate.

The properties of the sealing compound produced in this way according to the invention are presented in table 1 below. A commercially available, acrylate-based adhesive tape, "Coroplast 9015SPT" by the applicant, and also another commercially available butyl sealing compound "Deray ColdMelt" by DSG Canusa Co. were used as comparative examples.

In this context, it is important to note in particular that to achieve a 200% elongation, determined per ISO 527-2/1BA/300 using a material thickness of 1.5 mm of the inventive sealing compound—as is indicated in table 1—only a very low tensile stress of less than 0.100 N/mm², preferentially of less than 0.050 N/mm², need advantageously be applied. Complementarily, this applies conversely to the deformation under pressure—with regard to the easy manual processability of the sealing compound—according to the invention.

TABLE 1

Properties of different sealing compound by comparison

| Parameter | Standard | Unit | Coroplast 9015SPT | Present Disclosure | Deray ColdMelt |
|---|---|---|---|---|---|
| Material | | | Polyacrylate | Polyacrylate | Butyl rubber |
| UV-crosslinking | | | UV-A | UV-A | |
| Thickness | | mm | 1.5 | 1.5 | 1.5 |
| Density | | g/cm$^3$ | 1.0 | 1.0 | 1.4 |
| Color | | | transparent | transparent | black |
| Temperature resistance | | ° C. | −40-220 | −40-220 | −35-105 |
| Adhesion, steel | DIN EN 1939 | N/cm | 30 | 21 | 19 |
| Fracture resistance | ISO 527-2 1BA*/300 | N/mm$^2$ | 1.0 | 0.3 | 0.03 |
| Tensile strength, 100% elongation | ISO 527-2 1BA*/300 | N/mm$^2$ | 0.100 | 0.020 | 0.025 |
| Tensile strength, 200% elongation | ISO 527-2 1BA*/300 | N/mm$^2$ | 0.120 | 0.025 | 0.020 |
| Tensile strength, 600% elongation | ISO 527-2 1BA*/300 | N/mm$^2$ | 0.250 | 0.032 | — |
| Elongation at break | ISO 527-2 1BA*/300 | N/mm$^2$ | 800 | 2000 | 400 |
| Shear resistance | DIN EN 1943 method A (70° C.) 625 mm$^2$ | Min | >10,000 | 665 | <1 |
| Shear resistance | DIN EN 1943 method A (23° C.) 625 mm$^2$ | Min | >10,000 | 14 | <1 |

*Material thickness 1.5 mm

As already mentioned, the dimensions of sealing compound strips to be used for sealing are dependent on the number and thickness of the lines which are to be joined in the splice. The sealing compound of the present disclosure, and also the sealing compound of the two comparative examples as per table 1 were wrapped at a width of 30 mm and a length of 60 mm around a cable splice consisting of 7 cables each with a cross-section of 2.0 mm$^2$ placed on each side, and encased with DSG Canusa Co. heat-shrink tubes. The entire splice site had a diameter of about 10 mm.

The properties presented in table 2 were determined on the assembly of cable splice seals.

TABLE 2

Properties of cable splice seals produced with different sealing tapes

| | Present Disclosure example 1a | Present Disclosure example 1b | Comparative example 1 | Comparative example 2 |
|---|---|---|---|---|
| Encasing | Heat-shrink tube | Heat-shrink tube | Heat-shrink tube | Heat-shrink tube |
| Sealing compound | See present disclosure, table 1 | Like example 1a on PE foil | 9015SPT | Butyl rubber |
| Resistance in Ohms after 24 h brine test at 100 V | >2 × 10$^{10}$ | >2 × 10$^{10}$ | <0.1 | >2 × 10$^{10}$ |
| Air pressure test | >2 | >2 | 0.1 | >2 |

In another embodiment, the sealing compound was first applied at a width of 30 mm in the center of a transparent, 70 μm-thick PE foil having a width of 30 mm. This sealing tape was then placed around the splice and covered with a heat-shrink tube.

The present disclosure is not limited to the depicted exemplary embodiments, but also comprises all equivalent embodiments and applications within the scope of the claims and within the meaning of the invention.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A transparent sealing compound, in particular for use in a wall penetration of lines or in a splice site of a cable set, the sealing compound comprising a UV-polymerized and UV-crosslinked poly(alkyl acrylate) copolymer having a statistical or random copolymer structure, which is crosslinked such that its elongation amounts to more than 1000% for a material thickness of 1.5 mm according to ISO 527-2/1BA/300, and its shear strength is less than 1000 min according to DIN EN 1943 tested per method A, 625 mm$^2$ contact surface area;
  wherein the poly(alkyl acrylate) copolymer comprises a UV-polymerized and UV-crosslinked composition of a pre-polymerizate having a viscosity of 2.3 Pa-s measured at 23° C. using a Brookfield viscometer, spindle 3; and a first portion of one or more photo-initiators that absorb UV light in the range of 200 nm to 400 nm;
  wherein the pre-polymerizate is a reaction product of at least 89.0 wt. % of one or more alkyl acrylate monomers with 4 to 20 carbon atoms in the alkyl chain, wherein at least a portion of the alkyl acrylate monomers are multifunctional acrylate monomers, up to 1.9 wt. % of acrylic acid and/or methacrylic acid, and a second portion of the one or more photo-initiators;
  wherein the sum of the first portion and the second portion of the one or more photo-initiators is in the range of 0.1 wt. % to 1.0 wt %;
  wherein the total amount of the one or more alkyl acrylate monomers, the acrylic acid and/or methacrylic acid, and the one or more photoinitiators present in the poly(alkyl acrylate) copolymer adds up to 100 wt. %.

2. The sealing compound according to claim 1, wherein the sealing compound consists of the UV-polymerized and UV-crosslinked poly(alkyl acrylate) copolymer, which is crosslinked such that its elongation amounts to more than 1500% for a material thickness of 1.5 mm according to ISO 527-2/1BA/300 and its shear strength is less than 700 min according to DIN EN 1943 tested per method A, 625 mm$^2$ contact surface area.

3. The sealing compound according to claim 1, wherein the pre-polymerizate contains 0.01 wt. % to 1.00 wt. % of an acrylic acid ester, the acrylic acid ester being an alkyl diol diacrylate monomer and/or of an alkyl triol triacrylate monomer with 4 to 20 carbon atoms in the alkyl chain.

4. The sealing compound according to claim 1, wherein the sealing compound comprises a tensile stress of less than 0.100 N/mm$^2$ at 200% elongation as determined according to ISO 527-2/1 BA/300 for a material thickness of 1.5 mm.

5. The sealing compound according to claim 1, wherein the sealing compound comprises a tabular configuration having a thickness in the range of 1.0 to 5.0 mm.

6. A sealing tape, comprising a sealing compound according to claim 1 and a carrier material laminated on one side with the sealing compound.

7. The sealing tape according to claim 6, wherein the carrier material consists of a foil based on polyethylene, polypropylene, polyvinylchloride, polyurethane, polyester or polyamide, or of copolymerizates or coextrudates of the above mentioned materials.

8. The sealing tape according to claim 7, wherein the carrier material has a thickness in the range of 20 μm to 500 μm.

9. The sealing tape according to claim 7, wherein the carrier material has an edge not coated with the sealing compound.

10. The sealing tape according to claim 9, wherein a width of the non-coated edge is determined as a function of the size of the material to be sealed, the thickness of the sealing compound on the carrier material, and a pressure to be applied during application, and, in particular, in the case of a manually processed splice site having a size of about 3.0 cm and a sealing compound of 1.5 mm thickness, and a width in the range of 0.5 cm to 2.0 cm.

11. A method for the production of a sealing compound according to claim 1, the method comprising:
  providing a composition comprising:
    a pre-polymerizate having a viscosity of 2.3 Pa-s measured at 23° C. using a Brookfield viscometer, spindle 3; and
    a first portion of one or more photo-initiators that absorb UV light in the range of 200 nm to 400 nm;
    the pre-polymerizate comprising a reaction product of:
      at least 89.0 wt. % of one or more alkyl acrylate monomers with 4 to 20 carbon atoms in the alkyl chain, wherein at least a portion of the alkyl acrylate monomers are multifunctional acrylate monomers,
      up to 1.9 wt. % of acrylic acid and/or methacrylic acid, and
      a second portion of the one or more photo-initiators; and
  polymerizing and crosslinking the composition using UV light under exclusion of oxygen to form the sealing compound comprising a UV-polymerized and UV-crosslinked poly(alkyl acrylate) copolymer having a statistical or random copolymer structure; wherein the polymerization and crosslinking are carried out under the effect of a radiation dose in the range of 400 mJ/cm$^2$ to 600 mJ/cm$^2$;
  wherein the sum of the first portion and the second portion of the one or more photo-initiators is in the range of 0.1 wt. % to 1.0 wt. %,
  wherein the total amount of the one or more alkyl acrylate monomers, the acrylic acid and/or methacrylic acid, and the one or more photoinitiators present in the poly(alkyl acrylate) copolymer adds up to 100 wt. %.

12. The method according to claim 11, wherein the polymerization and crosslinking take place in a two-step process, wherein at least in the second step an alkyl diol diacrylate and/or an alkyl triol triacrylate monomer with 4 to 20 carbon atoms in the alkyl chain is/are used as monomer(s).

13. The method according to claim 11, wherein the polymerization and crosslinking are carried out under the effect of UV-A radiation.

14. The sealing compound according to claim 1, wherein the pre-polymerizate is the reaction product of:
  at least 98.0 wt % of one or more alkyl acrylate monomers with 4 to 20 carbon atoms in the alkyl chain, wherein the alkyl acrylate monomers contain 0.01 wt. % to 1.0 wt. % of multifunctional acrylate monomers,
  up to 1.9 wt % of acrylic acid and/or methacrylic acid, and
  0.1 wt. % to 1.0 wt. % of one or more photo-initiators which absorb UV light in the range of 315 nm to 380 nm.

15. The sealing compound according to claim 4, wherein the sealing compound comprises a tensile stress of less than 0.050 N/mm$^2$ at 200% elongation as determined according to ISO 527-2/1 BA/300 for a material thickness of 1.5 mm.

16. The sealing tape according to claim 8, wherein the carrier material has a thickness in the range of 50 μm to 200 μm.

17. The method according to claim 11, the method comprising:
  98.0 wt. % to 99.9 wt. % of one or more alkyl acrylate monomers with 4 to 20 carbon atoms in the alkyl chain, 0 wt. % to 1.9 wt. % of acrylic acid and/or methacrylic acid, and 0.1 wt. % to 1.0 wt. % of one or more photo-initiators which absorb UV light in the range of 315 nm to 380 nm are polymerized and crosslinked by using UV light under a nitrogen flushing.

\* \* \* \* \*